United States Patent Office 2,960,490
Patented Nov. 15, 1960

2,960,490

STABILIZED VINYL CHLORIDE RESINS CONTAINING ALKALI METAL FORMATES OR OXALATES

Thomas M. Hinkes, Park Forest, Ill., assignor to Victor Chemical Works, a corporation of Illinois No Drawing. Filed June 15, 1955, Ser. No. 515,769

18 Claims. (Cl. 260—45.85)

This invention relates to the heat and light stabilization of vinyl chloride resins; and more particularly, to the heat and light stabilization of plastisol compositions containing a vinyl chloride polymer or copolymer.

It is well recognized that the vinyl chloride-containing polymers and copolymers tend to decompose slightly under the influence of heat used in the preparation of plastic objects, and under long periods of exposure to light, to cause undesirable discoloration in the finished resin product. The instability of these polymers and copolymers is generally believed to be due to the decomposition of vinyl chloride substituents in the resin.

Heretofore, a number of different compounds have been proposed for the heat and light stabilization of vinyl-type resins, but have not been entirely satisfactory from the standpoint of performance or cost.

It has now been found that excellent heat and light stability of chlorine-containing vinyl-type resins may be obtained by the inclusion of small amounts of alkali metal (i.e., sodium and potassium) oxalates and formates in the plastic formulation prior to fusion of the mixture in forming the final plastic coating, film or solid object.

The hot-melt plastic or plastisol formulation generally includes a vinyl chloride polymer or a copolymer, a plasticizer and the stabilizer compound. Vinyl chloride-containing copolymers may be formed by polymerizing vinyl chloride with other copolymerizable materials (i.e., ethylenically unsaturated monomers), such as vinyl acetate, vinyl butyrate, styrene, alkyl acrylates and methacrylates, acrylic nitriles and the like. If desired, a variety of pigments and fillers may be included in the formulation.

Plastisol compositions are known in the art as a type of dispersion in which the proportion of plasticizer is high enough to be the sole dispersion medium giving a liquid or paste composition which may be used for moldings or coatings without the presence of a volatile component.

In the preparation of such plastisol compositions, the various ingredients are mixed and milled together in a suitable mill for a sufficient period to effect an intimate suspension of the finely divided particles. The resulting mixed material is then deaerated and subjected to sufficient heat to fuse the mass into usable plastic products. It is generally necessary to heat the plastisol composition to a temperature of about 325°–350° F. for a sufficient period to cause fusion throughout the full thickness of the resin section. Without the presence of the heat stabilizing agent, the vinyl chloride-containing resins become badly discolored during such heating periods.

Polyvinyl chloride polymers and the various copolymers of vinyl chloride and vinyl acetate exemplify the various resin compounds which are suitable for use in the plastisol compositions of this invention. Such resin products are available on the market under such trade names as "Vinylite," and "Geon."

Various commercial plasticizers, known to be suitable for use with vinyl chloride resins, may be satisfactorily used in the plastisol compositions herein described. These plasticizers include dioctyl phthalate, trioctyl phosphate, tricresyl phosphate, acetyl tributyl citrate, etc.

The compounds which are most suitable for the heat stabilization of the plastisol compositions are the sodium and potassium formates and oxalates and mixtures of these compounds. While the ordinary technical grade compounds are quite suitable, it is generally preferred to employ the relatively pure salts.

In formulating a typical plastisol composition, 150 parts by weight of polyvinyl chloride resin, 150 parts by weight of dioctyl phthalate plasticizer, and 9 parts by weight sodium oxalate were milled together in a ball mill to form a homogeneously dispersed mixture. The mixture was deaerated by subjecting it to vacuum, and then poured into circular aluminum trays which measured 2½ inches in diameter and 3/16 inch deep. The trays were placed in a furnace and heated to 350° F. for 15 minutes to completely fuse and cure the resin disc. The cured discs were cooled and compared for discoloration with fused plastisols which did not contain the stabilizer.

Table I shows the results of a number of examples using several combinations of resins, plasticizers and stabilizing agents. These results show that the sodium and potassium oxalates and formates and mixtures of these compounds give a marked improvement in heat stability over the control plastisol composition.

TABLE I

| Plastisol Resin Components | Control | Formulations (parts by weight) | | | | | | | | | | | | | | |
|---|---|---|---|---|---|---|---|---|---|---|---|---|---|---|---|---|
| | | A | B | C | D | E | F | G | H | I | J | K | L | M | N | O |
| Geon 121 [1] | | | | | | | | | 150 | | | | | | | | |
| Vinylite QYNV Resin [1] | 150 | 150 | 150 | 150 | 150 | 150 | 150 | 150 | | | | | 150 | 150 | 150 | 150 |
| Vinylite VYNV Resin [1] | | | | | | | | | | 150 | | | | | | |
| Vinylite VYNS Resin [1] | | | | | | | | | | | 150 | | | | | |
| Vinylite VYHH Resin [1] | | | | | | | | | | | | 150 | | | | |
| Di 2-ethylhexyl phthalate (Flexol DOP) Plasticizer | 150 | 150 | 150 | 150 | 150 | 150 | | | 150 | 150 | 150 | 150 | 150 | 150 | 150 | 150 |
| Acetyl tributyl citrate plasticizer | | | | | | | | 150 | | | | | | | | |
| Tricresyl phosphate plasticizer | | | | | | | 150 | | | | | | | | | |
| Sodium oxalate stabilizer | | 9 | | | 4.5 | 4.0 | 4.0 | 4.0 | 4.0 | 4.0 | 4.0 | 4.0 | | | | |
| Sodium formate stabilizer | | | 9 | | 4.5 | | | | | | | | | | | |
| Potassium oxalate stabilizer | | | | 4 | | | | | | | | | | | | |
| Potassium formate stabilizer | | | | | | | | | | | | | | | | |
| Commercial stabilizer (barium stearate) | | | | | | | | | | | | | 9.0 | 4.0 | | |
| Commercial stabilizer (lead stearate) | | | | | | | | | | | | | | | 9.0 | |
| Color (after heating 15 min. at 350° C.)[2] | P | G | G | G | G | G | F | G | G | G | G | G | F | F | P | 9.0 G |

[1] Vinylite QYNV is a commercial polyvinyl chloride resin. Vinylite VYNV is a commercial 95% vinyl chloride—5% vinyl acetate resin. Vinylite VYNS is a commercial 88–90% vinyl chloride—12–10% vinyl acetate resin. Vinylite VYHH is a commercial 85–88% vinyl chloride—15–12% vinyl acetate resin. Geon 121 is a commercial polyvinyl chloride resin.

[2] G=Good (very little or no discoloration). F=Fair (noticeable discoloration). P=Poor (dark red or yellow color).

In the examples shown, the proportion of plasticizer used was equal to the weight of the vinyl chloride-containing resin. Such proportions are not critical but may be varied according to the characteristics desired in the final plastic product. For thick or massable plastic products, the amount of plasticizer might well be reduced to less than half of the disclosed amount. Such variation in the amount of plasticizer does not materially affect the heat stabilizing effect on the resin component.

In the production of plastic objects from my plastisol compositions, it is possible to control the clarity of the plastic by selection of the stabilizing salt or mixtures thereof together with other additives such as pigments and filler or combinations with other stabilizing agents. For example, a mixture of sodium formate and sodium oxalate gave a clear plastic whereas either alone would produce a translucent plastic. A pure sodium oxalate with a small amount of aluminum hydroxide produced an opaque plastic. However, in all such cases the improvement in heat stability was not adversely affected.

In order to more accurately point out the heat stability effect on the new plastisol compositions, a series of test discs were made up with various amounts of sodium formate and sodium oxalate as stabilizing agents. These were heated at 350° F. for 15 minutes and evaluated by the relative change in color. For color evaluation a numerical scale was devised as follows:

*Numerical color scale*

| Color Number | Description |
| --- | --- |
| 0 | No color (water-white). |
| 1 | Very pale (amber, red, yellow or any other hue). |
| 2 | Pale (amber, red, yellow or any other hue). |
| 3 | Light (amber, red, yellow or any other hue). |
| 4 | Medium (amber, red, yellow or any other hue). |
| 5 | Dark (amber, red, yellow or any other hue). |

Table II shows the relative heat stability in terms of the amount of color developed in fusing plastisol compositions consisting of 150 parts by weight of polyvinyl chloride, 150 parts by weight of dioctyl phthalate and the amounts of sodium oxalate or formate shown in the table, for a period of 15 minutes at 350° F.

TABLE II

| Amount of Stabilizer (pts. by wt.) | Plastisol color No. after 15 minutes at 350° F. |
| --- | --- |
| Control (no stabilizer) | 3.0 |
| 0.5 sodium oxalate | 2.0 |
| 1.0 sodium oxalate | 1.5 |
| 2.0 sodium oxalate | 1.0 |
| 4.0 sodium oxalate | 1.0 |
| 6.0 sodium oxalate | 0.5 |
| 9.0 sodium oxalate | 1.5 |
| 12.0 sodium oxalate | 1.5 |
| 4.0 sodium formate | 1.0 |
| 6.0 sodium formate | 1.0 |
| 9.0 sodium formate | 0.5 |
| 12.0 sodium formate | 0.5 |

The results shown in Table II indicate that the maximum stabilization was obtained with the use of about 6 parts of sodium oxalate (about 4.0% based on the weight of the resin), or about 9.0 to 12 parts of sodium formate (about 6.0–8.0% based on weight of resin). However, a markedly improved color stability was obtained with the use of as little as 0.5 part of sodium oxalate per 150 parts of the polyvinyl chloride resin in the plastic product.

Similar examples show that with plastisols containing 150 parts polyvinyl chloride and 150 parts of tricresyl phosphate plasticizer without stabilizer and with 4 parts of sodium oxalate, the color number comparison was 4 and 3 respectively. With acetyl tributyl citrate as the plasticizer, the color number comparison was 2.5 and 1.0 respectively. The use of other suitable plasitcizers shows similar improved color stability of the plastisol product resulting from the use of the formate and oxalate stabilizing salts.

A comparison was made of several plastisol compositions using various vinyl chloride-containing resins with equal amounts of di-2-ethylhexyl phthalate plasticizer and with and without sodium oxalate as the stabilizer in amount equal to 2.7% of the resin component. Table III shows the color numbers resulting from the heat fusion of the plastisols at 350° F. for 15 minutes.

TABLE III

| Resin Used (Expressed in Wt. percent) | Weight percent of Sodium Oxalate Used | Plastisol Color Number aft. 15 Min. at 350° F. |
| --- | --- | --- |
| Polyvinyl chloride | None | 3 |
| Do | 2.7 | 1 |
| Vinyl chloride, 95% + vinyl acetate, 5% | None | 4 |
| Do | 2.7 | 3 |
| Vinyl chloride, 88–90% + vinyl acetate, 12–10% | None | 2 |
| Do | 2.7 | 1 |

These results illustrate the improved heat stability of several typical plastisol compositions containing vinyl chloride polymers and copolymers of vinyl chloride with various amounts of vinyl acetate.

Similar improved heat stability was obtained with plastisol compositions containing pigments and fillers which may be added to vary the appearance of the finished plastic product.

A wide variety of vinyl chloride-containing plastisol formulations may be produced in accordance with the present invention which in part comprises the discovery that the heat stability of the vinyl chloride component is greatly improved by combination with a small proportion of a sodium or potassium formate or oxalate or mixtures of such salts. The ratio of the stabilizing formate or oxalate salt to the amount of vinyl chloride in the plastisol composition may be varied from about 0.33% to about 6.0% (e.g., 0.5 to 9.0 parts by weight stabilizer per 150 parts of resin). Somewhat higher amounts may be used without detrimental effect, but do not essentially further improve the heat stabilizing effect.

The following plastisol formulations were milled and deaerated in order to illustrate the light stability induced by my stabilizer. Test specimens were cured in the oven for the optimum time of 15 minutes at 350° F.

| Plastisol | Formulation | | |
| --- | --- | --- | --- |
| | Vinylite QYNV [1] | Flexol DOP [2] | Sodium Oxalate |
| | (parts by weight) | | |
| Control | 150 | 150 | |
| Stabilized | 150 | 150 | 4 |

[1] Vinylite QYNV— a commercial polyvinyl chloride resin.
[2] Flexol DOP—di-2-ethylhexyl phthalate.

The specimens were placed under an ultraviolet lamp elevent inches from the light source. The color of the plastic discs was determined from the aforesaid numerical color scale both before and during exposure to the ultraviolet light. The following tabulation shows the color comparison of the control and sodium oxalate stabilized discs after different time intervals of exposure:

| Plastisol | Plastisol color after exposure to ultraviolet light | | |
| --- | --- | --- | --- |
| | 0 Hours | 144 Hours | 864 Hours |
| Control | 3 | 1 | 3 |
| Stabilized | 1 | 0 | 0 |

This tabulation indicates that a plastisol formulation containing about 2.7% sodium oxalate, percent based on the weight of resin, greatly improves the light stability of the plastic. The sodium oxalate stabilized formulation was exposed to 864 hours of ultraviolet light with no observable discoloration, whereas the control formulation exposed for the same time interval was noticeably colored.

Vinyl chloride-containing resins appear to possess their most effective or desirable overall heat and light stability properties when about 4 parts by weight of sodium or potassium formate, oxalate or mixtures of said salts are incorporated with about 150 parts by weight of the vinyl chloride-containing polymer or copolymer. However, satisfactory overall stability is obtained when as low as about 2 parts by weight of the oxalate, formate or mixtures thereof are incorporated with about 150 parts by weight of vinyl chloride-containing polymer or copolymer.

The term "vinyl chloride-containing resin" refers to a resin containing a vinyl chloride polymer or copolymer.

The foregoing detailed description has been given for clearness of understanding only and no unnecessary limitations should be understood therefrom as modifications will be obvious to those skilled in the art.

I claim:

1. A plastisol resin composition free of stearates and inorganic peroxides and having a stabilizer, which consists essentially of a nonstearate plasticizer, a vinyl chloride resin from the group of polyvinyl chloride and vinyl chloride copolymers, said plastisol resin composition containing a stabilizing amount of a nonstearate stabilizing agent of the group consisting of alkali metal formate, alkali metal oxalate and admixtures thereof, said stabilizing agent being free of inorganic peroxides.

2. The composition set forth in claim 1 wherein the vinyl chloride-containing resin is a copolymer of vinyl chloride and vinyl acetate.

3. The composition set forth in claim 1 wherein the weight proportion of vinyl chloride is at least about 85% of the copolymer.

4. The composition of claim 1 wherein the stabilizing agent contains sodium formate.

5. The composition of claim 1 wherein the stabilizing agent contains sodium oxalate.

6. The composition of claim 1 wherein the stabilizing agent contains potassium formate.

7. The composition of claim 1 wherein the stabilizing agent contains potassium oxalate.

8. The composition set forth in claim 1 wherein the plastisol resin composition contains at least about 2 parts by weight of the stabilizing agent for about every 150 parts by weight of the vinyl chloride-containing resin.

9. The composition set forth in claim 1 wherein the plastisol resin composition contains at least about 4 parts by weight of the stabilizing agent for about every 150 parts by weight of the vinyl chloride-containing resin.

10. The composition set forth in claim 1 wherein the plastisol resin composition contains at least about 0.5 part by weight of the stabilizing agent for about every 150 parts by weight of the vinyl chloride-containing resin.

11. A resin composition comprising the fused plastisol resin composition of claim 1.

12. A resin composition comprising the fused plastisol resin composition of claim 2.

13. A resin composition comprising the fused plastisol resin composition of claim 4.

14. A resin composition comprising the fused plastisol resin composition of claim 5.

15. A resin composition comprising the fused plastisol resin composition of claim 6.

16. A resin composition comprising the fused plastisol resin composition of claim 7.

17. As a new composition of matter, a plastisol resin composition free of stearates and inorganic peroxides and having a stabilizer, which consists essentially of a nonstearate plasticizer, a vinyl chloride resin from the group consisting of polyvinyl chloride and vinyl chloride copolymers, said plastisol resin composition containing at least about 6 parts by weight of sodium oxalate for about every 150 parts by weight of vinyl chloride resin, said plastisol resin composition being free of stearates and inorganic peroxides.

18. As a new composition of matter, a plastisol resin composition free of stearates and inorganic peroxides and having a stabilizer, which consists essentially of a nonstearate plasticizer, a vinyl chloride resin from the group consisting of polyvinyl chloride and vinyl chloride copolymers, said plastisol resin composition containing at least about 9–12 parts by weight of sodium formate for about every 150 parts by weight of vinyl chloride resin, said plastisol resin composition being free of stearates and inorganic peroxides.

References Cited in the file of this patent

UNITED STATES PATENTS

| | | |
|---|---|---|
| 2,181,478 | Kligor | Nov. 28, 1939 |
| 2,507,142 | Chaban | May 9, 1950 |
| 2,647,296 | Shive | Aug. 4, 1953 |
| 2,753,321 | Jankens | July 3, 1956 |

OTHER REFERENCES

Parker et al.: Modern Plastics, February 1953, pages 129, 130, 132, 134 and 218.